(12) United States Patent
Lim et al.

(10) Patent No.: US 8,139,532 B2
(45) Date of Patent: Mar. 20, 2012

(54) ERROR CONTROL METHOD, MEDIUM ACCESS CONTROL (MAC) FRAME DESIGNING METHOD, AND TERMINAL REGISTRATION METHOD IN WIRELESS COMMUNICATION SYSTEM, AND RECORDING MEDIUM

(75) Inventors: Hyoung-Soo Lim, Daejeon (KR); Woo-Yong Choi, Daejeon (KR); Yong-Sun Kim, Daejeon (KR); Jae-Young Ahn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 708 days.

(21) Appl. No.: 12/214,180

(22) Filed: Jun. 16, 2008

(65) Prior Publication Data

US 2008/0259903 A1 Oct. 23, 2008

Related U.S. Application Data

(62) Division of application No. 10/695,135, filed on Oct. 27, 2003, now Pat. No. 7,391,774.

(30) Foreign Application Priority Data

Dec. 16, 2002 (KR) .......................... 10-2002-0080317

(51) Int. Cl.
*H04Q 7/00* (2006.01)
*H04W 72/00* (2009.01)
(52) U.S. Cl. ........................................ 370/329; 455/450
(58) Field of Classification Search .................. None
See application file for complete search history.

(56) References Cited

U.S. PATENT DOCUMENTS

| 5,307,349 | A |   | 4/1994 | Schloss et al. |
| 5,754,754 | A |   | 5/1998 | Dudley et al. |
| 5,754,947 | A | * | 5/1998 | Tanabe et al. ................. 455/515 |
| 6,367,045 | B1 |  | 4/2002 | Khan et al. |

(Continued)

FOREIGN PATENT DOCUMENTS

DE    10122698    11/2002

(Continued)

OTHER PUBLICATIONS

European Office Action ref: Patent Application No. 03 024 954 4—1237, dated Oct. 8, 2007.

*Primary Examiner* — Hassan Phillips
*Assistant Examiner* — Eunsook Choi
(74) *Attorney, Agent, or Firm* — Kile Park Goekjian Reed & McManus PLLC

(57) ABSTRACT

The MAC frame in a wireless communication system includes a terminal ID allocated to each of multiple terminals. At least one connection ID is allocated to each terminal having the terminal ID, and sub-carrier allocation information is allocated to each connection having the connection ID. The sub-carrier allocation information includes a sub-carrier allocation status for each sub-carrier, and the number of allocated information bits for each sub-carrier. The sub-carrier allocation status and the number of allocated information bits for each sub-carrier can be allocated, by sub-carriers, to the sub-carrier allocation information using a same number of bits; or the information on the sub-carrier allocation status is first allocated to the sub-carrier allocation information and the number of allocated information bits for each sub-carrier is allocated.

14 Claims, 18 Drawing Sheets

U.S. PATENT DOCUMENTS

| | | | |
|---|---|---|---|
| 6,473,438 B1 * | 10/2002 | Cioffi et al. | 370/468 |
| 6,904,283 B2 * | 6/2005 | Li et al. | 455/450 |
| 6,934,752 B1 * | 8/2005 | Gubbi | 709/225 |
| 7,236,787 B1 * | 6/2007 | Tamura et al. | 455/437 |
| 2002/0055356 A1 | 5/2002 | Dulin et al. | |
| 2002/0086707 A1 * | 7/2002 | Struhsaker et al. | 455/561 |
| 2002/0118666 A1 | 8/2002 | Stanwood et al. | |
| 2002/0126650 A1 | 9/2002 | Hall et al. | |
| 2002/0159506 A1 | 10/2002 | Alamouti et al. | |
| 2002/0181609 A1 * | 12/2002 | Tzannes | 375/295 |
| 2003/0072395 A1 * | 4/2003 | Jia et al. | 375/341 |
| 2003/0086366 A1 * | 5/2003 | Branlund et al. | 370/208 |
| 2003/0153273 A1 | 8/2003 | Ebert et al. | |
| 2003/0169722 A1 | 9/2003 | Petrus et al. | |
| 2003/0174686 A1 * | 9/2003 | Willenegger et al. | 370/342 |
| 2004/0013112 A1 * | 1/2004 | Goldberg et al. | 370/389 |
| 2004/0081133 A1 * | 4/2004 | Smavatkul et al. | 370/346 |

FOREIGN PATENT DOCUMENTS

| | | |
|---|---|---|
| EP | 0 786 880 | 7/1997 |
| EP | 1 2 63 160 A1 | 12/2002 |
| KR | 1019930022750 | 11/1993 |
| KR | 1020010064225 | 7/2001 |
| KR | 2002-0039188 | 5/2002 |
| KR | 1020020049790 | 6/2002 |
| WO | WO 00/62466 | 10/2000 |
| WO | WO 02/49306 | 6/2002 |

* cited by examiner

ERROR CONTROL METHOD, MEDIUM ACCESS CONTROL (MAC) FRAME DESIGNING METHOD, AND TERMINAL REGISTRATION METHOD IN WIRELESS COMMUNICATION SYSTEM, AND RECORDING MEDIUM

The present patent application is a Divisional of application Ser. No. 10/695,135, filed Oct. 27, 2003 now U.S. Pat. No. 7,391,774.

CROSS REFERENCE TO RELATED APPLICATION

This application is based on Korea Patent Application No. 2002-80317 filed on Dec. 16, 2002 in the Korean Intellectual Property Office, the content of which is incorporated herein by reference.

BACKGROUND OF THE INVENTION (a) Field of the Invention

The present invention relates to a medium access control (MAC) frame constitution method, and an error control method. More specifically, the present invention relates to a MAC frame constitution method in a wireless communication system using orthogonal frequency division multiple access (OFDMA) technology.

(b) Description of the Related Art

The services provided in the conventional wireless communication systems are those defined in the IEEE 802.16 standard, such as a real-time polling service, a non-real-time polling service, or best effort (BE) service. In the IEEE 802.16 standard, the same number of information bits are used for every time and frequency allocated to one connection in allocation of the time and frequency resources. In this case, sub-carriers of the same channel gain are allocated irrespective of channel characteristics, so it is impossible to adaptively cope with the channel characteristics, resulting in a deterioration of the system efficiency.

SUMMARY OF THE INVENTION

It is an advantage of the present invention to provide a MAC frame structure that adaptively allocates time and frequency resources according to the channel status.

To achieve the advantage of the present invention, both the sub-carrier allocation status and the information bit allocation number of each sub-carrier are transferred as sub-carrier allocation information.

In one aspect of the present invention, there is provided a MAC frame designing method that includes (a) allocating a corresponding connection ID to each terminal; and (b) assigning information on a sub-carrier allocation status for the connection ID and the number of allocated information bits of each sub-carrier to the sub-carrier allocation information.

Here, the step (b) includes allocating the number of allocated information bits of each sub-carrier in addition to the information on the sub-carrier allocation status. Alternatively, the step (b) includes assigning the information on the sub-carrier allocation status and then the number of allocated information bits of each sub-carrier for the allocated sub-carriers; or assigning, by sub-carriers, both the information on the sub-carrier allocation status and the number of allocated information bits.

In another aspect of the present invention, there is provided a registration method for registering a terminal with an access point using a MAC frame in a wireless communication system. The MAC frame is divided into a downlink sub-frame including a broadcast interval and a first management connection interval, and an uplink sub-frame including an access interval and a second management connection interval. The broadcast interval is used for transmitting downlink and uplink map messages. The registration method includes: (a) the access point receiving a ranging request message from the terminal using the access interval; (b) the access point sending ranging allocation information to the terminal using the downlink and uplink map messages; (c) the access point performing ranging through a ranging slot; (d) the access point receiving a registration request message from the terminal using the second management connection interval; and (e) the access point sending information on whether to permit the registration to the terminal using the first management connection interval.

Preferably, the access point sends the uplink and downlink map messages to the terminal using the broadcast interval before it receives the ranging request message.

In the ranging process, the access point receives a ranging response message from the terminal, sends the downlink and uplink map messages including the allocated ranging slot to the terminal, receives the ranging request message from the terminal through the allocated ranging slot, and sends the ranging response message to the terminal using the first management connection interval.

In addition, the access point receives a ranging slot request message from the terminal using the second management connection interval, reallocates the ranging slot to the terminal, and sends the downlink and uplink map messages including information on the reallocated ranging slot. Subsequently, the access point receives a ranging request message from the terminal using the reallocated ranging slot, and sends a ranging response message using the first management connection interval.

In a third aspect of the present invention, there is provided a recording medium with a built-in program which implements a function of designing a MAC frame to register a terminal with an access point in a wireless communication system. The function includes: allocating an access interval to the MAC frame so as to enable the terminal to send a ranging request message to the access point; allocating a broadcast interval to the MAC frame so as to enable the access point to send downlink and uplink map messages including allocated ranging information to the terminal; allocating an uplink management connection interval to the MAC frame so as to enable the terminal to send a registration request message to the access point; and allocating a downlink management connection interval to the MAC frame so as to enable the terminal to send information on whether to permit the registration and a ranging response message to the terminal.

In a fourth aspect of the present invention, there is provided an error control method which is done using a control connection between receiver and transmitter in a wireless communication system. The error control method includes: (a) setting up a control connection between the receiver and the transmitter; (b) the receiver checking a reception status of MPDUs (MAC Protocol Data Units) by frames when traffic exists; (c) the receiver constituting an acknowledgement (ACK) message for data transmission in a previous frame and sending it to the transmitter; and (d) disconnecting the control connection when the traffic ends.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

Figure 1:
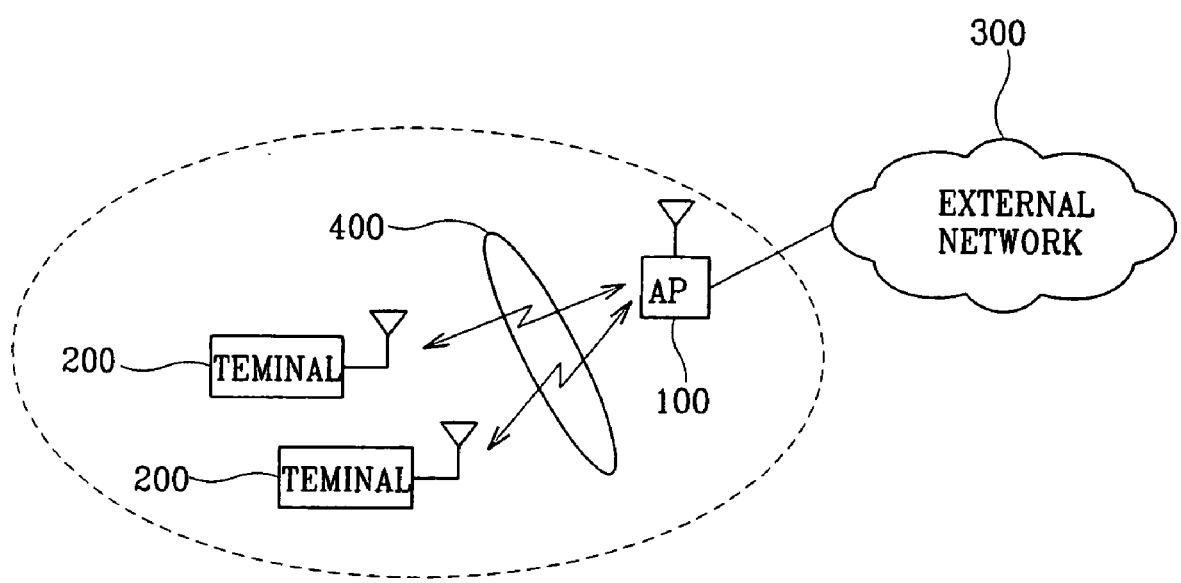
FIG. 1 is a schematic diagram of a wireless communication system according to an embodiment of the present invention.

FIG. 1 is a schematic diagram of a wireless communication system according to an embodiment of the present invention.

The wireless communication system according to the embodiment of the present invention is, as shown in FIG. 1, a point-to-multipoint communication system comprising an AP (Access Point) 100, and a plurality of terminals 200 in communication with the AP by OFDM signal scheme. The AP 100 is connected to an Ethernet or an external network 300 and in wireless communication with the multiple terminals 200 on a wireless channel 400. The multiple terminals 200 and the AP 100 share one wireless channel 400, so data must be transmitted without a collision.

In the MAC (Medium Access Control) layer of this wireless communication system, a connection set-up process for BE (Best Effort) service, real-time VBR (Variable Bit Rate) service, and non-real-time VBR service is required.

The representative traffic of the real-time VBR service is MPEG (Moving Picture Experts Group) video stream. To set up a connection for the real-time VBR service, service parameters are used that include traffic parameters such as maximum data transfer rate, average data transfer rate, or maximum allowable burst value; and QoS (Quality of Service) parameters such as maximum delay time, allowable jitter value, or data loss rate. The representative traffic of the non-real-time VBR service is FTP (File Transfer Protocol). To set up a connection for the non-real-time VBR service, service parameters are used that include traffic parameters such as maximum data transfer rate, average data transfer rate, or maximum allowable burst value; and QoS parameters such as maximum delay time, or data loss rate. The scheduler of the AP 100 allocates wireless resources adequately to the corresponding VBR connection according to each service parameter value. The representative traffic of the BE service is HTTP (HyperText Transfer Protocol), SMTP (Simple Mail Transfer Protocol), or the like. There is no service parameter for the BE service.

Considering the characteristic of each service, as for the BE service, of which the service parameter does not exist, a connection set-up is performed previously when the terminals 200 perform an initial registration with the AP 100. But, for the VBR service, an appropriate connection set-up is necessary according to the service parameters concerned.

Once a connection for the real-time or non-real-time VBR service is set up, the terminal 200 piggybacks its buffer status on the last data MPDU (MAC Protocol Data Unit) of the corresponding connection of every MAC frame, so it can request the AP 100 for an amount of data to be transferred to the next frame. To change the service parameters of the connection, the terminal 200 preferably negotiates with the AP 100 on the resource allocation change using a management connection. In response to the change request, the AP 100 transmits changed downlink and uplink maps to the next frame using appropriate scheduling. According to circumstances, however, the AP 100 may accept only a part of the resource allocation change requested by the terminal 200.

In the AP registration process of the terminal 200, the AP 100 allocates a connection ID for the BE service to the corresponding terminal 200. When the terminal 200 newly requests the BE service on the management connection, the AP 100 allocates wireless resources using the BE connection ID of the terminal 200. Once the connection for the BE service is set up, the terminal 200 piggybacks its buffer status on the last data MPDU of the connection of every MAC frame, so it can request the AP 100 for an amount of data to be transferred to the next frame. In response to the change request, the AP 100 transmits changed downlink and uplink maps to the next frame using appropriate scheduling. But, according to circumstances, the AP 100 may accept only a part of the resource allocation change requested by the terminal 200. In addition, the AP 100 may not guarantee defined wireless resource allocation in the next frame for the BE connection in case of shortage of the wireless resources. The BE service is then provided using the connection ID for EB that is allocated one by one to every terminal 200.

For stable data transmission on the non-real-time VBR or BE connection, an error control function must be provided. The error control function will be described with reference to FIGS. 2 and 3.

Figure 2:
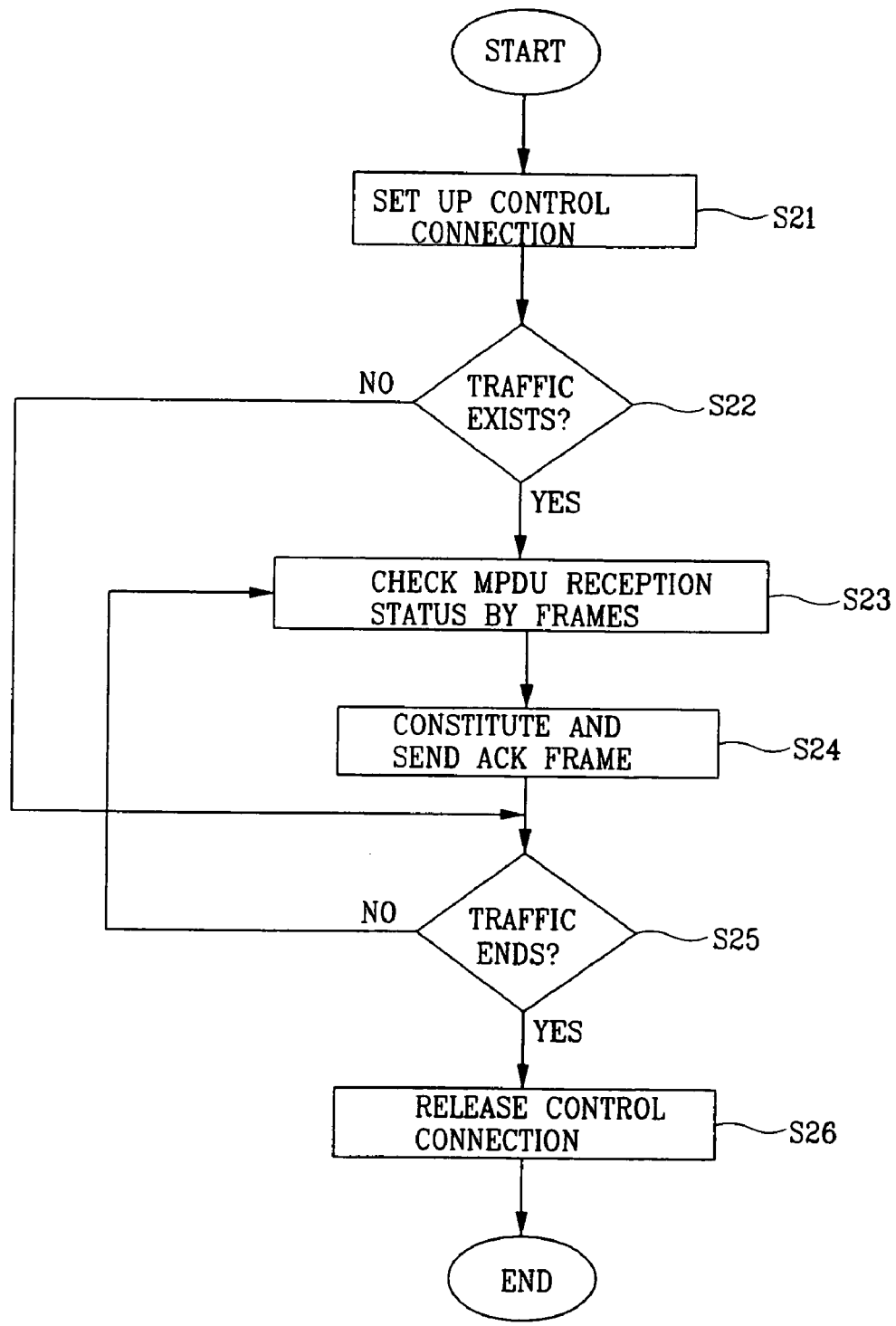
FIG. 2 is a flow chart of an error control process performed at the receiver according to an embodiment of the present invention.
Figure 3:
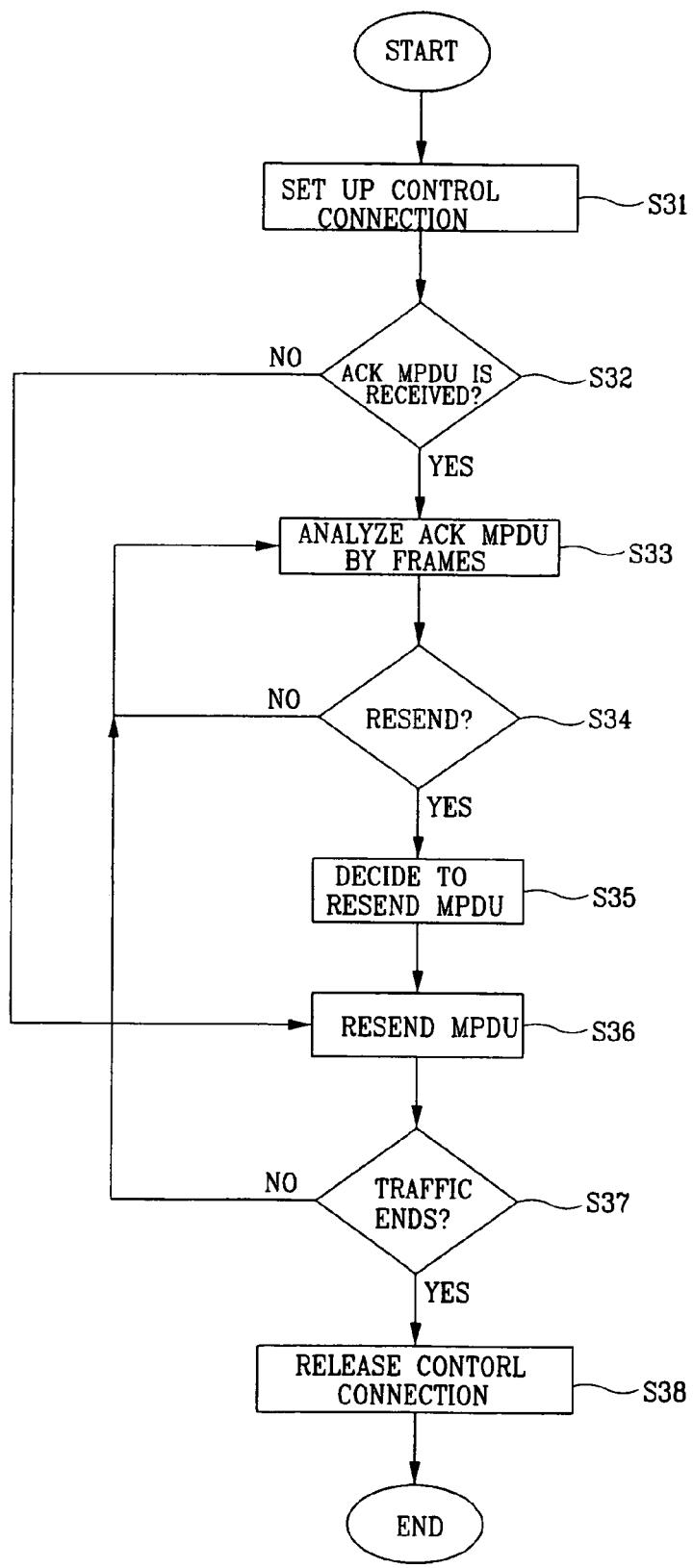
FIG. 3 is a flow chart of an error control process performed at the transmitter according to an embodiment of the present invention.

FIG. 2 is a flow chart of an error control process performed at the receiver according to an embodiment of the present invention, and FIG. 3 is a flow chart of an error control process performed at the transmitter according to an embodiment of the present invention.

During a process of initialization or registration with a new sub-network, the terminal 200 enters a step of registering with the corresponding AP 100. In the meantime, one management connection identified by a 10-bit connection ID is set up on the terminal 200 and the AP 100. Once the management connection between the terminal 200 and the AP 100 is set up, the AP 100 periodically allocates wireless resources for management connection to the terminal 200 by a basic mode set in the MIB (Management Information Base). The terminal 200 periodically reports the AP 100 of the management MPDU amount to be transferred, and the AP 100 appropriately allocates wireless resources for management connection to the terminal 200 according to the management MPDU amount reported by the terminal 200. On the management connection, the terminal 200 can request the AP 100 for new connection set-up, connection change, or disconnection.

The access information of channels for management connection is broadcast using a broadcast message in the broadcast interval. For stable data transmission on the management connection, the error control function must be provided.

Next, the error control method performed at the receiver will be described with reference to FIG. 2. Each control connection is set up for non-real-time VBR, BE, and management connections to provide the error control function (in step 21). The receiver determines whether or not traffic is received (in step 22). If there is no traffic received, then the receiver determines whether or not the traffic is terminated (in step 25). If there is received traffic, then the receiver checks the MPDU reception status by frames (in step 23). The receiver constitutes an acknowledgement (ACK) message ACK MPDU for data transmission in the previous frame and sends the ACK message ACK MPDU (in step 24). The ACK message has a payload field that represents the first and last sequence numbers successfully received in succession among the MPDUs transmitted in the previous frame. Without data transmission in the previous frame, the receiver does not send the ACK message. The receiver checks whether or not the traffic is terminated (in step 25). If the traffic is terminated, then the receiver disconnects the control connection (in step 26); otherwise, it rechecks the MPDU reception status (in step 23).

Next, the error control method performed at the transmitter will be described with reference to FIG. 3. Each control connection is set up for non-real-time VBR, BE, and management connections (in step 31). The receiver sends the ACK message ACK MPDU for data transmission in the previous frame. Then, the transmitter determines whether or not the ACK message ACK MPDU is received (in step 32). If the ACK message ACK MPDU is not received yet, then the transmitter resends MPDUs (in step 36). Upon receiving the ACK message ACK MPDU, the transmitter analyzes the received ACK message ACK MPDU by frames (in step 33), and determines whether to resend the MPDUs (in step 34).

As stated above, the payload field of the ACK message includes information on the first and last sequence numbers successfully received in succession among the MPDUs transmitted in the previous frame. In particular, when there are several ranges of the MPDUs successfully received in succession, the payload field includes the sequence numbers of the MPDUs of the first range only. Among the MPDUs transferred in the previous frame, those out of the range of the sequence numbers reported on the control connection are retransmitted (in steps 35 and 36). If the first sequence number reported on the control connection is not the sequence number of the first MPDU transferred in the previous frame, then the transmitter resends all the MPDUs transferred in the previous frame. The transmitter resends the MPDUs and checks whether or not the traffic ends (in step 37). If the traffic is terminated, then the transmitter disconnects the control connection (in step 38); otherwise, it analyzes the ACK MPDU by frames a second time (in step 33).

The error control function described with reference to FIGS. 2 and 3 must be performed continuously during the holding time of the connection under the error control.

Figure 4:
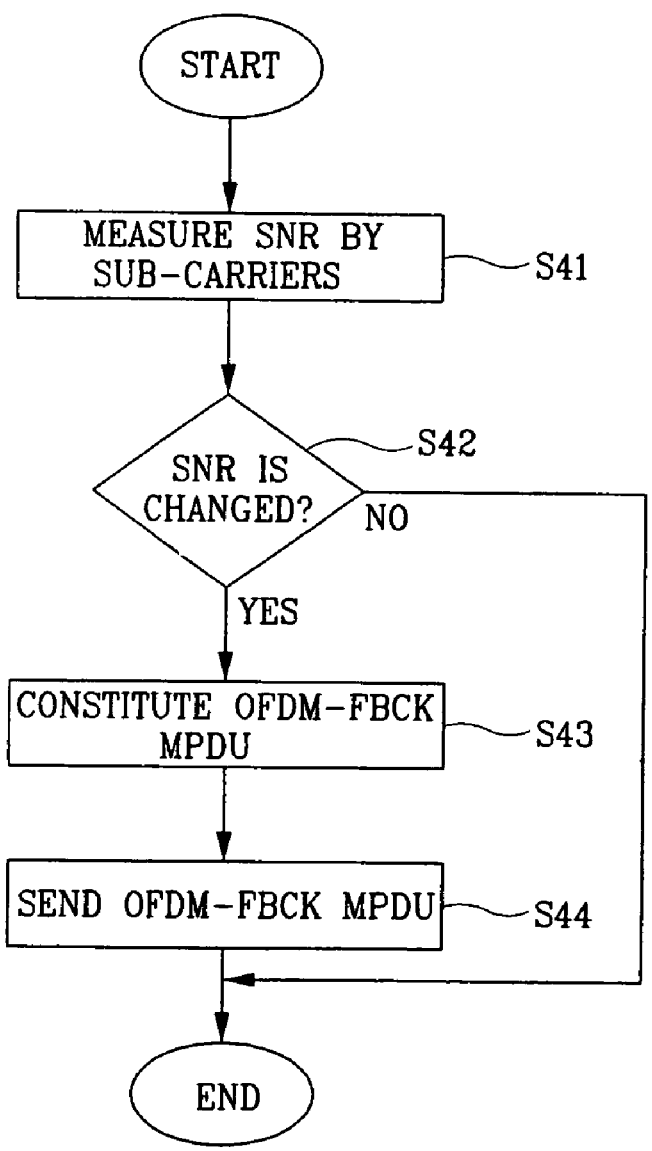
FIG. 4 is a flow chart of an OFDM feedback information transfer process according to an embodiment of the present invention.

Reference will now be made to FIG. 4 as to an OFDM feedback information transfer function performed at the terminal 200. FIG. 4 is a flow chart showing an OFDM feedback information transfer process according to an embodiment of the present invention.

Each terminal 200 measures the signal-to-noise ratio (SNR) in the units of frame in regard to the transmission quality of each sub-carrier, so as to report the AP 100 of the downlink transmission quality by sub-carriers (in step 41). If the SNR of each sub-carrier is changed from the previous SNR measurement by at least 1 dB (in step 42), then the terminal 200 constitutes OFDM-FBCK MPDUs (in step 43), and sends them to the AP 100 (in step 44). Each terminal 200 can transmit at most one OFDM-FBCK MPDU per frame.

In the embodiment of the present invention, the OFDM signaling method is adapted as a signal modulation method in designing the physical layer providing the above-mentioned services. The OFDM signaling method is widely used in high-speed data communication systems using communication channels having a limited frequency bandwidth, because it reduces a deterioration of performance caused by inter-symbol interference for multi-path fading channels and has a high frequency efficiency.

Next, the channel characteristics between one AP and multiple terminals will be described with reference to FIGS. 5 to 9.

Figure 5:
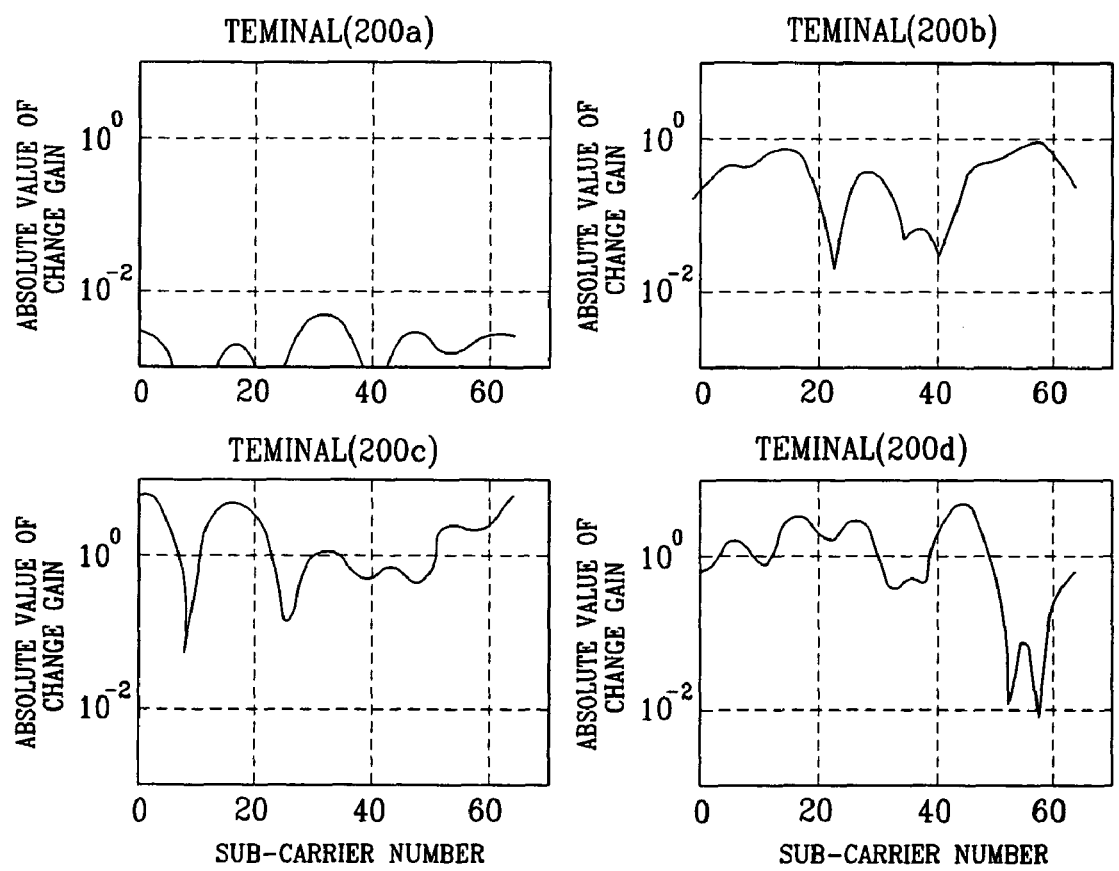
FIG. 5 shows the channel gain of each sub-carrier measured at a plurality of terminals.
Figure 6:
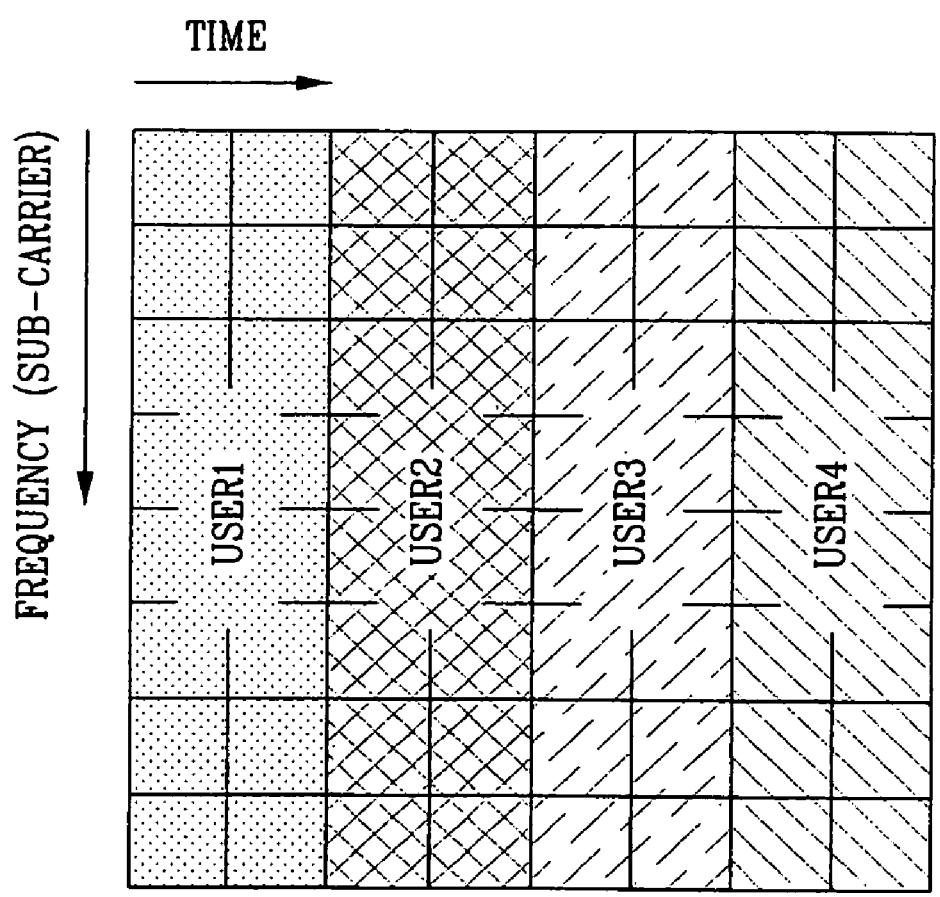
FIGS. 6, 7, and 8 are conceptual diagrams of time and frequency domains in TDMA, FDMA, and OFDMA, respectively.
Figure 7:
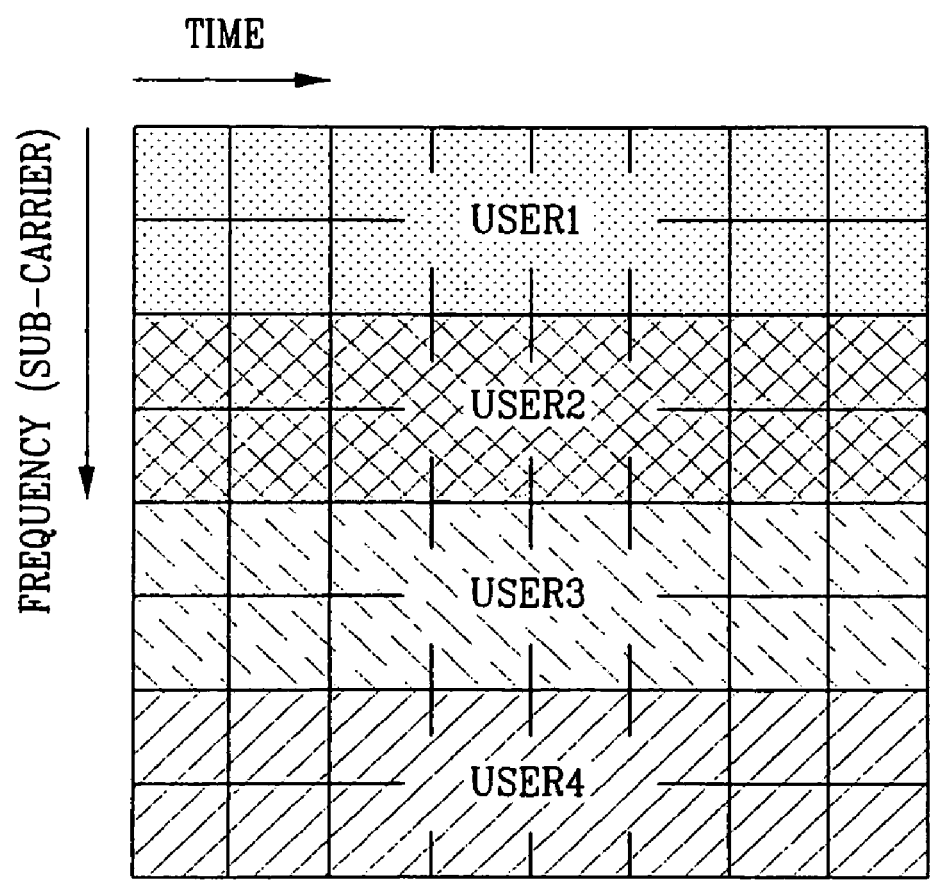
Figure 8:
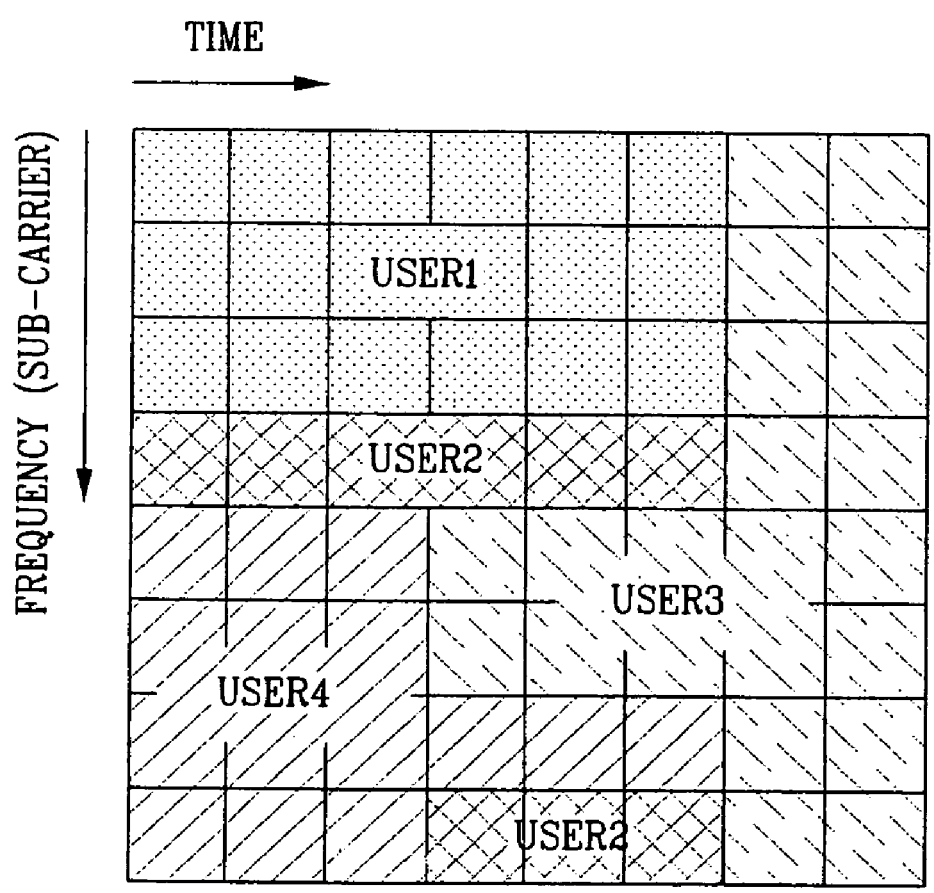

FIG. 5 shows channel gains for the respective sub-carriers as measured at a plurality of terminals; FIGS. 6, 7, and 8 are conceptual diagrams of time and frequency domains in TDMA, FDMA, and OFDMA, respectively; and FIG. 9 shows a comparison of system efficiencies according to the number of users.

As in the embodiment of the present invention, when there are one AP 100 and multiple terminals 200 and the channel characteristics are not changed over time, the channel characteristics between the terminals 200 and the AP 100 are different from one terminal to another. As shown in FIG. 5, for example, the channel gain of one OFDM sub-carrier is low at terminal 200a, but high at other terminals 200b, 200c, and 200d. It is preferable in this case to allocate this sub-carrier to the terminals 200b, 200c, and 200d, and another sub-carrier of a higher channel gain to the terminal 200a, thereby enhancing the system resource efficiency. Namely, the channel environment of each terminal 200 is measured in allocation of sub-carrier channels such that the sub-carrier channel having the highest channel gain in the aspect of each terminal 200 is used for communication between the AP 100 and the corresponding terminal 200 so as to maximize the frequency resource efficiency. A multiple access method that enables one AP 100 to communicate with multiple terminals 200 using a same OFDM symbol interval is called OFDMA (OFDM Access), and the OFDMA method of allocating resources adaptively to the channel environment is called adaptive OFDMA In the traditional TDMA (Time Division Multiple Access) and FDMA (Frequency Division Multiple Access) methods shown in FIGS. 6 and 7, respectively, time or frequency resources are fixedly allocated to the individual users irrespective of the difference in the channel gain of each sub-carrier, so the channel capacity for an increased number of users is the same as that for a single user. Contrarily, in the OFDMA method that adaptively allocates sub-carrier channels as in the embodiment of the present invention, a sub-carrier channel having the highest channel gain for each user is selected and allocated to the corresponding user so as to enhance the channel capacity, as shown in FIG. 8.

Figure 9:
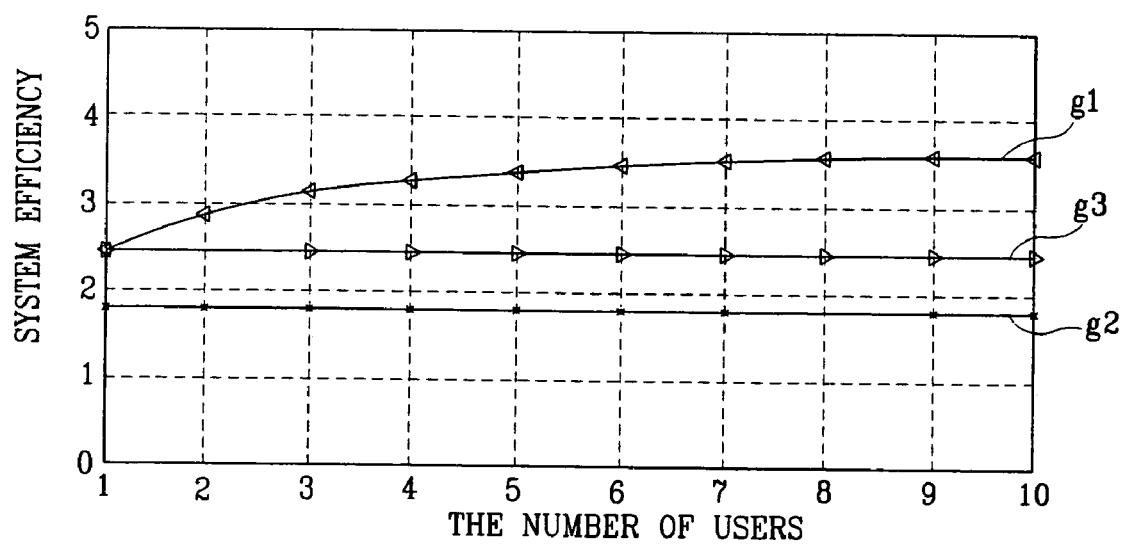
FIG. 9 shows a comparison of system efficiencies depending on the number of users.

In the case where there are four users in FIG. 9, the OFDMA method (g1) of adaptively allocating the modulation method of each sub-carrier channel is in system efficiency by about 83% than the TDMA or FDMA method (g2) of uniformly allocating fixed time or frequency resources by users, and by about 33% higher than the TDMA or FDMA method (g3) of using an adaptive modulation method.

The terminal 200 belonging to the wireless communication system according to the embodiment of the present invention can maintain multiple connections at the same time and allocate multiple sub-carriers having an independent modulation method per connection. Expediently, it is assumed in the following description that all the terminals have no more one connection.

Theoretically, the terminal 200 can estimate the number of information bits modulated on each allocated sub-carrier channel only if it has information on its allocated sub-carrier channel, the corresponding channel gain, and the received information transfer rate. In this case, the channel gain of each sub-carrier is calculated at the AP 100 and at each terminal 200 using an independent channel estimation process. The AP 100 has only to send information on a list of sub-carrier channels allocated to each terminal 200 and the information transfer rate to the terminal 200, so it can reduce channel dissipation.

Now, a description will be given as to a MAC frame for transferring only information on a list of sub-carrier channels and the information transfer rate with reference to FIGS. 10 to 15.

Figure 10:
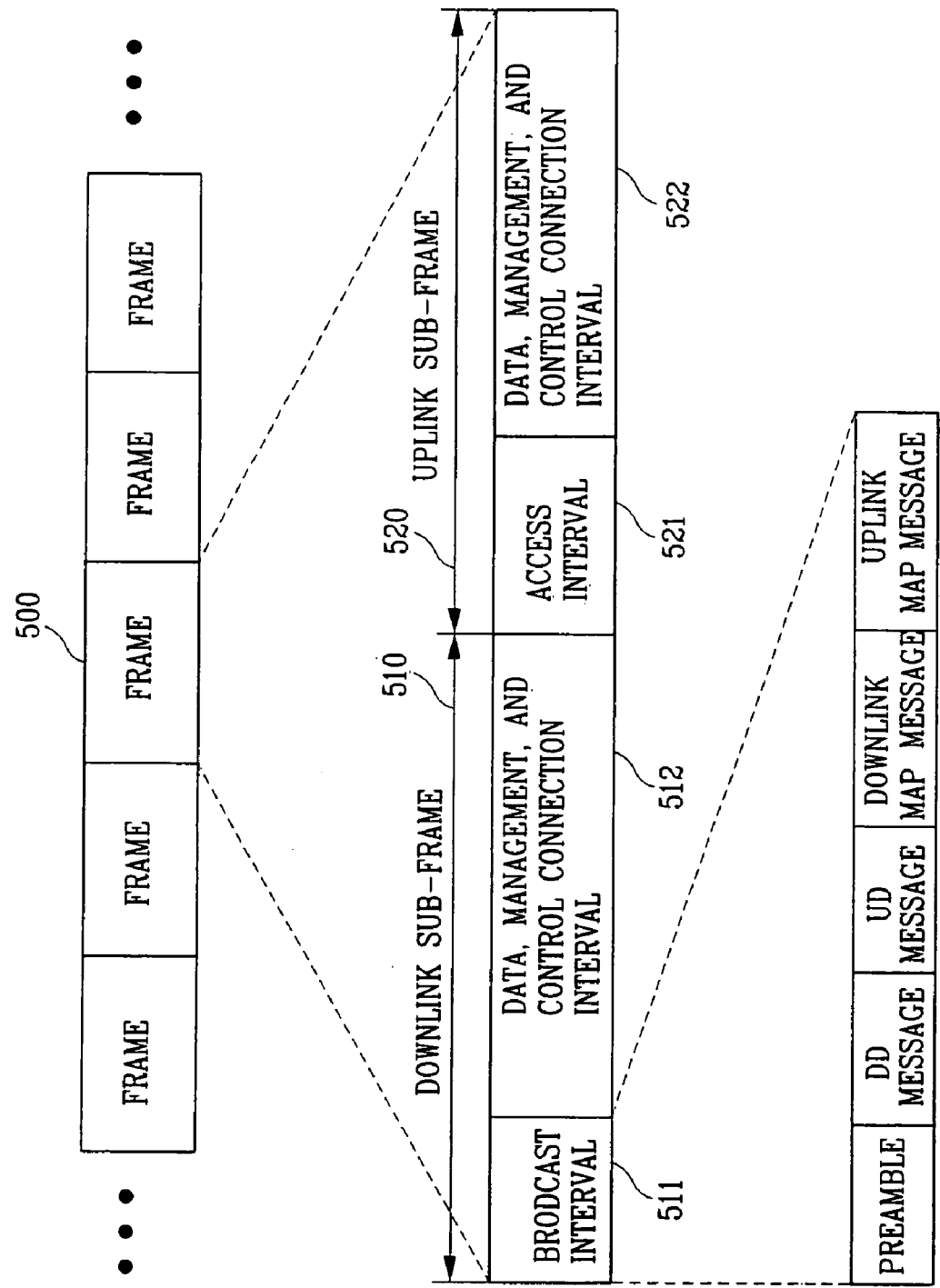
FIG. 10 is a schematic diagram of a MAC frame according to an embodiment of the present invention.
Figure 11A:
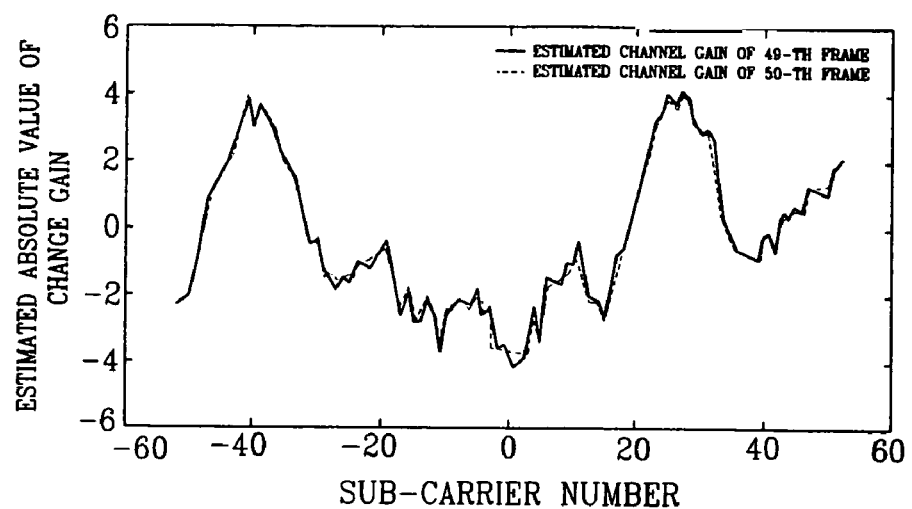
FIG. 11a shows the result of channel gain estimation.

FIG. 10 is a schematic diagram of a MAC frame according to an embodiment of the present invention; FIG. 11*a* shows the result of channel gain estimation; and FIG. 11*b* shows the number of allocated bits by sub-carriers.

One MAC frame 500 of the wireless communication system according to the embodiment of the present invention is, as shown in FIG. 10, temporally divided into a downlink sub-frame 510 and an uplink sub-frame 520. The downlink is a channel for signal transmission from AP 100 to each terminal 200, and the uplink is a channel for signal transmission from each terminal 200 to AP 100. The time division duplexing method is used for distributing uplink and downlink channels. The downlink sub-frame 510 is divided into, according to function, a broadcast interval 511, and a downlink data, management, and control connection interval 513. The uplink sub-frame 520 is divided into, according to function, an access interval 521, and an uplink data, management, and control connection interval 522. These intervals 511, 512, 521, and 522 have a variable length. The slot is defined as a multiple of the OFDM symbol. These intervals 511, 512, 521 and 522 may be composed of a slot having a different length. The access interval 521 is an interval used for the terminals 200 trying to get a first access to the AP 100, and also for a contention interval possibly having a collision among the terminals 200. The broadcast interval 511 carries a preamble, a DD message, a UD message, a downlink map message, or an uplink map message.

In the adaptive OFDMA method, the channel gain estimation value calculated at the AP 100 must be matched to that calculated at the individual terminals 200 in order to correctly estimate the number of allocated information bits for each sub-carrier. Actually, the channel gain estimation values are unmatched, in which case the information bit allocation pattern by sub-carriers is changed even with small error estimation. When the transmitter differs from the receiver in the analysis result of the information bit allocation pattern for each sub-carrier, the transport bit information allocated to the sub-carrier channels with allocation errors are all missed which causes serious deterioration of the whole performance.

Figure 11B:
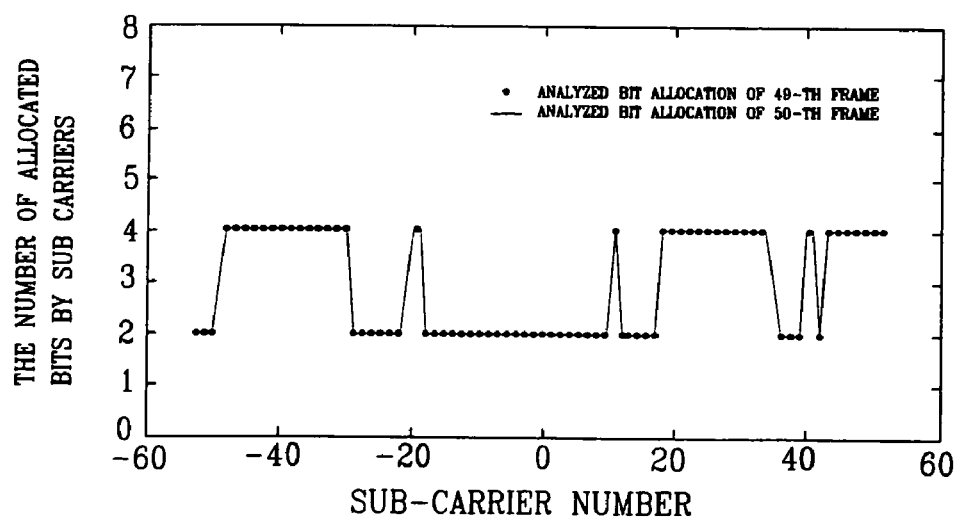
FIG. 11b shows the number of allocated bits for each sub-carrier.

FIGS. 11*a* and 11*b* show the result of a simulation for channel gain estimation at a frequency-selective fading channel having a SNR of 10 dB: FIG. 11*a* presents the result of channel gain estimation in the 49th and 50th frames for a same channel; and FIG. 11*b* presents the estimated number of bits allocated to each received sub-carrier based on the result of the channel gain estimation of FIG. 11*a*. It can be seen from FIG. 11*b* that even a small difference of channel gain estimation leads to a considerable error in the calculation of the number of allocated bits.

Next, a method for reducing estimation error in calculating the number of allocated bits will be described in detail with reference to FIG. 12.

Figure 12:
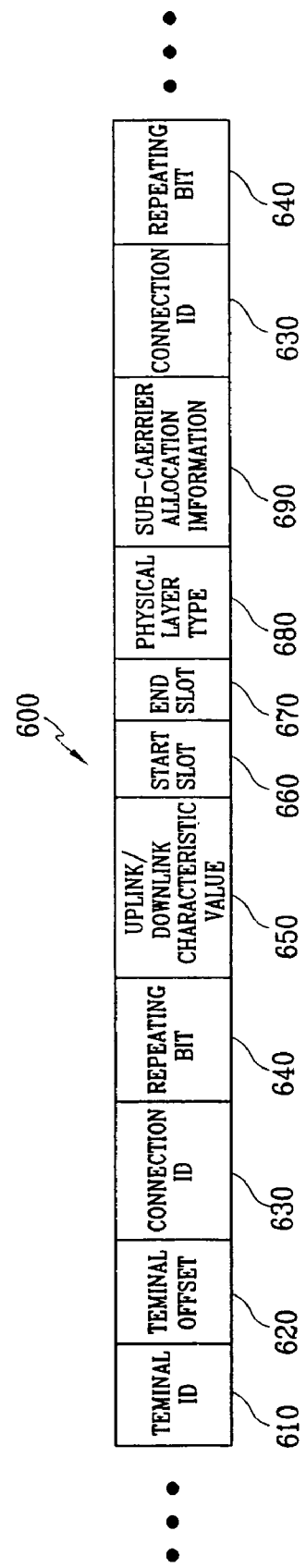
FIG. 12 is a structural diagram of a downlink/uplink map information element in a downlink/uplink map message transferred using a broadcast interval in the frame structure according to the embodiment of the present invention.

FIG. 12 is a structural diagram of a downlink/uplink map information element of a downlink/uplink map message transferred in the broadcast interval in the frame structure according to the embodiment of the present invention.

The downlink/uplink map information element 600 according to the embodiment of the present invention comprises, as shown in FIG. 12, a terminal ID field 610, a terminal offset field 620, a connection ID field 630, a repeating bit field 640, an uplink/downlink characteristic field 650, a start slot field 660, an end slot field 670, a physical layer type field 680, and a sub-carrier allocation information field 690.

The terminal ID field 610 enables every terminal 200 connected to the AP 100 to check whether or not the map information corresponds to itself. The terminal ID is allocated to each terminal from the AP 100 during the initial registration process. If the terminal ID field 610 is matched to its terminal ID, then the terminal 200 processes map information from the terminal ID to a value just before the value represented by the terminal offset field 620. It the terminal ID field 610 is unmatched to its terminal ID, then the terminal 200 skips as much of the map information as the value represented by the terminal offset field 620 and checks the value of the terminal ID field 610. The terminal 200 repeats this procedure until the terminal ID field 610 is matched to its terminal ID.

As described above, each terminal 200 capable of maintaining multiple connections at the same time may have multiple connections in an interval defined by the terminal ID field 610 and terminal offset field 620. The connection ID field 630, the repeating bit field 640, the uplink/downlink characteristic field 640, the start slot field 660, the end slot field 670, the physical layer type field 680, and the sub-carrier allocation information field 690 are allocated to each connection. The connection ID field 630, the repeating bit field 640, the uplink/downlink characteristic field 650, the start slot field 660, the end slot field 670, and the physical layer type field 680 have a fixed length, but the sub-carrier allocation information field 690 has a variable length.

The connection ID field 630 represents a connection ID unique to every terminal 200 connected to the network. Connection ID 0 is reserved for the AP 100 and is used in the initial registration process. The repeating bit field 640 provides information on whether or not the value of the sub-carrier allocation information field 690 of the corresponding connection is identical to that of the sub-carrier allocation information field 690 of the previous connection. For example, when the value of the sub-carrier allocation information field 690 of the connection is identical to that of the sub-carrier allocation information field 690 of the previous connection, the repeating bit field 640 is set to 1 and the sub-carrier allocation information field 690 in the corresponding connection is not added. This prevents unnecessary allocation of the repeated sub-carrier allocation information 690 to minimize band dissipation.

The uplink/downlink characteristic field 650 is a code for discriminating a set of formulated physical layer parameters of the downlink/uplink. The start and end slot fields 660 and 670 represent the positions of the start and end slots of each connection, respectively. The physical layer type field 680 represents the type of the physical layer operated by the system. The sub-carrier allocation information field 690 includes allocated sub-carrier information for each connection and the number of allocated information bits for each sub-carrier.

Next, a description will be given as to a method for transferring the number of allocated information bits for each sub-carrier to the terminal or the connection by using the sub-carrier allocation information field 690 with reference to FIGS. 13, 14, and 15.

Figure 13:
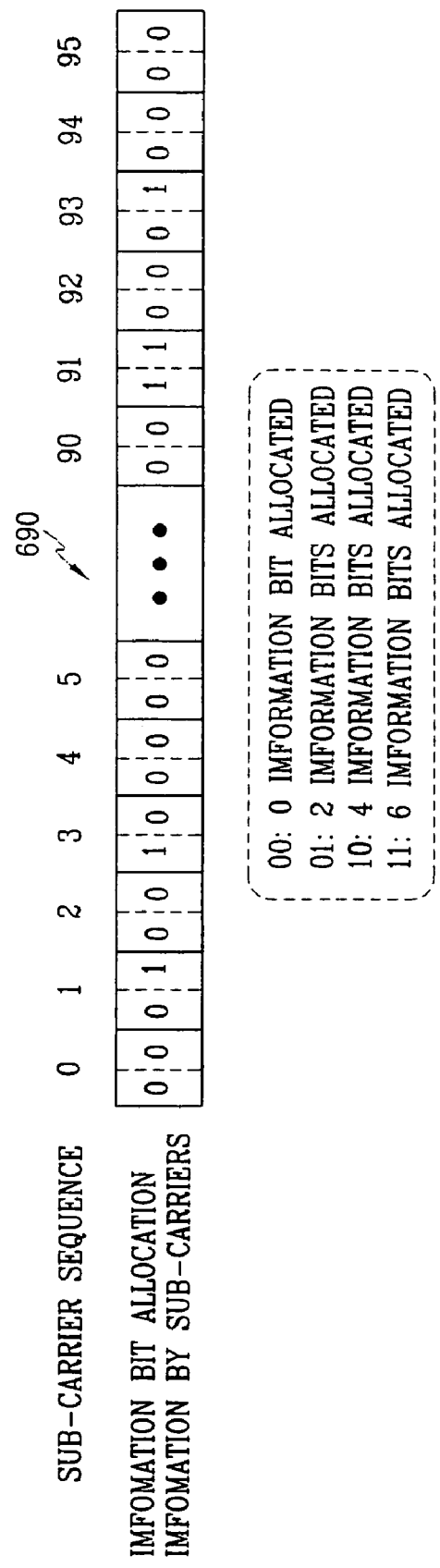
FIGS. 13, 14, and 15 are schematic diagrams of the sub-carrier allocation information according to first, second, and third embodiments of the present invention, respectively.
Figure 14:
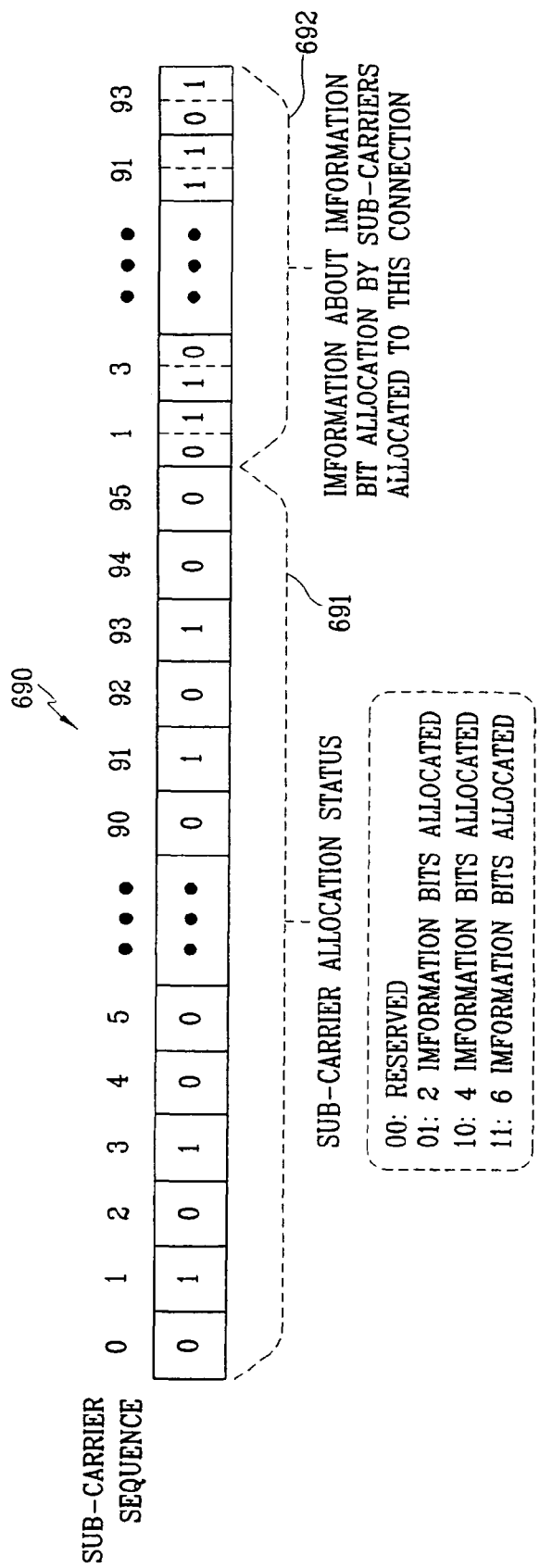
Figure 15:
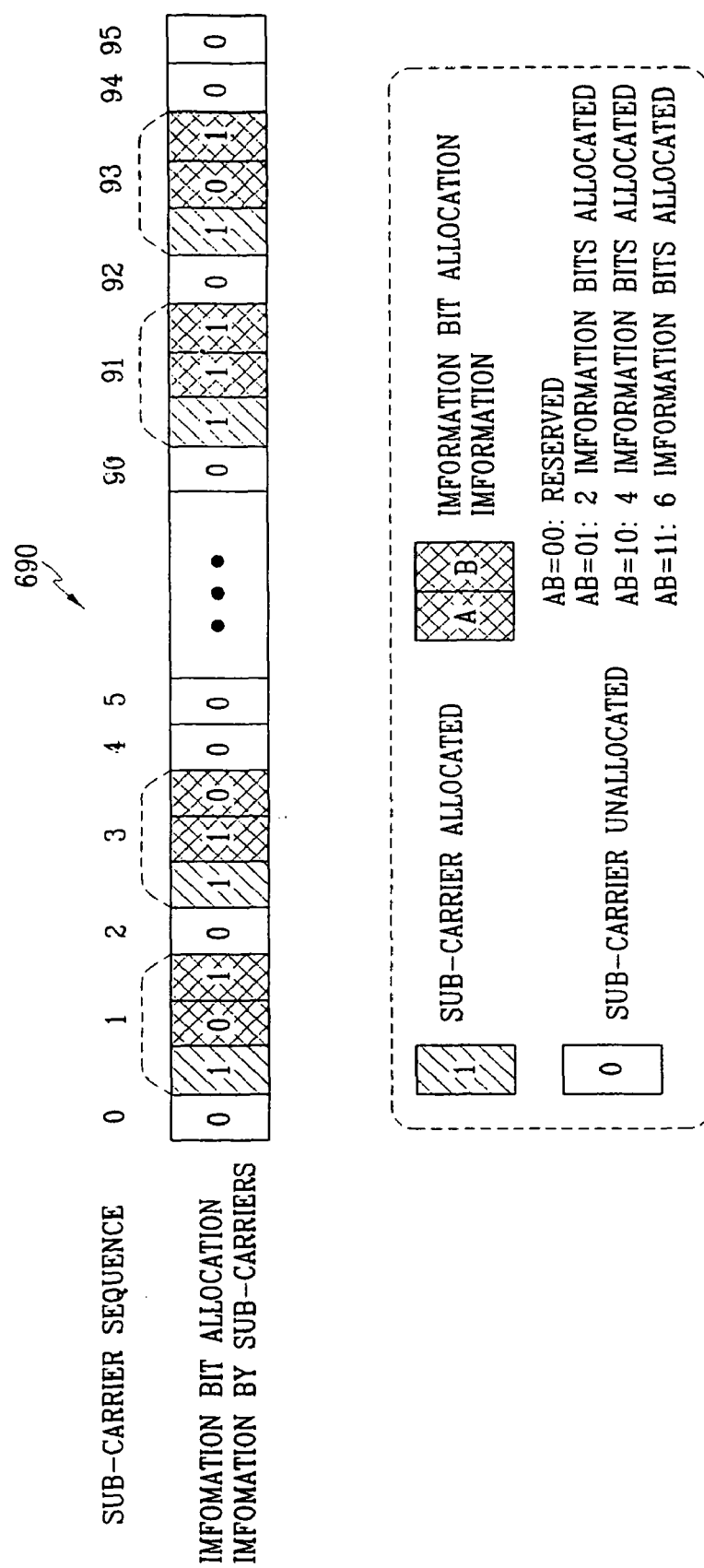

FIGS. 13, 14, and 15 are schematic diagrams showing the structure of the sub-carrier allocation information according to first, second, and third embodiments of the present invention.

In the sub-carrier allocation information structure 690 according to the first embodiment of the present invention, as shown in FIG. 13, information on whether or not a sub-carrier is currently allocated, and the number of allocated information bits for each sub-carrier are transmitted to every terminal or connection with a same number of bits. FIG. 13 shows, for example, the case where the number of sub-carriers per OFDM symbol is 96 and two bits are allocated for transmitting the maximum number of allocated information bits per sub-carrier. If the 2-bit information allocated to each sub-carrier is 00 in this case, then no information bit is allocated; if the 2-bit information is 01, then 2 information bits are allocated; if the 2-bit information is 10, then 4 information bits are allocated; and if the 2-bit information is 11, then 6 information bits are allocated.

In this manner, the field representing the number of allocated information bits of a predetermined size is assigned to all the sub-carriers, thus facilitating implementation, in the first embodiment of the present invention. Although the number of allocated information bits is added even for the sub-carriers not allocated to the corresponding terminal or connection in the first embodiment of the present invention, it may not be added for the sub-carriers not allocated to the terminal or connection. The embodiment of this pattern will now be described with reference to FIG. 14 as follows.

In the sub-carrier allocation information structure 690 according to the second embodiment of the present invention, as shown in FIG. 14, information 691 on whether or not a sub-carrier is allocated is first transferred to each terminal or connection, and information 692 on the number of allocated information bits is then additionally transferred to the allocated sub-carriers only. FIG. 14 shows, for example, the case where the number of sub-carriers per OFDM symbol is 96 and two bits are used to represent the maximum number of allocated information bits per sub-carrier. One bit is allocated to transmit information on whether or not each sub-carrier is allocated, and the fields representing the number of allocated information bits are then added for the allocated sub-carriers only. Namely, the fields representing the number of allocated information bits are added for the first, third, . . . , 91st and 93rd sub-carriers having a sub-carrier allocation status value of 1. The values of these fields are 01, 10, . . . , 11 and 01, respectively. For example, the field values of 01, 10 and 11 represent 2-, 4- and 6-bit information bit allocations, respectively.

In the second embodiment of the present invention, the fields representing the number of allocated information bits are added for only the sub-carriers allocated to the terminal or connection to minimize channel dissipation. But, in the second embodiment of the present invention, the corresponding terminal or connection is required to memorize the positions of the sub-carriers allocated to it and map the number of allocated information bits later. Next, a description will be given as to an embodiment for transferring information on whether or not each sub-carrier is allocated, in addition to the number of allocated information bits with reference to FIG. 15.

In the sub-carrier allocation information structure 690 according to the third embodiment of the present invention, as shown in FIG. 15, information on whether or not the sub-carrier is allocated, and the number of allocated information bits are transferred at the same time to each terminal or connection. FIG. 15 shows, for example, the case where the number of sub-carriers per OFDM symbol is 96 and two bits are used to represent the maximum number of allocated information bits per sub-carrier. When the information on whether the sub-carrier is allocated has a value of 1 (i.e., the sub-carrier is allocated), information on the number of allocated information bits for the sub-carrier is added. The information on the number of allocated information bits can be 2-bit information of 01, 10 or 11 as in the examples of FIGS. 13 and 14. In FIG. 5, the information representing the number of allocated information bits that has a value of 01, 10, . . . , 11 or 01 is added to the first, third, . . . , 91st, or 93rd sub-carrier of which the allocation status value is 1.

In the third embodiment of the present invention, whether or not the sub-carrier is allocated is checked in the order of sub-carriers so as to add information on the number of allocated information bits for the allocated sub-carriers only. This reduces channel dissipation, and facilitates implementation in hardware, because the terminal or connection can immediately acquire information on the number of allocated information bits.

A comparison of the first, second, and third embodiments of the present invention in the aspect of channel dissipation reveals that the transferring method of the first embodiment shown in FIG. 13 has less channel dissipation with a statistically small number of terminals or connections for transferring resource allocation information every frame, and that the transferring methods of the second and third embodiments shown in FIGS. 14 and 15 have less channel dissipation with a statistically large number of terminals or connections for transferring resource allocation information every frame.

Next, reference will be made to FIGS. 16 and 17 in regard to an initial registration process for the terminal 200 registering with the AP 100.

Figure 16:
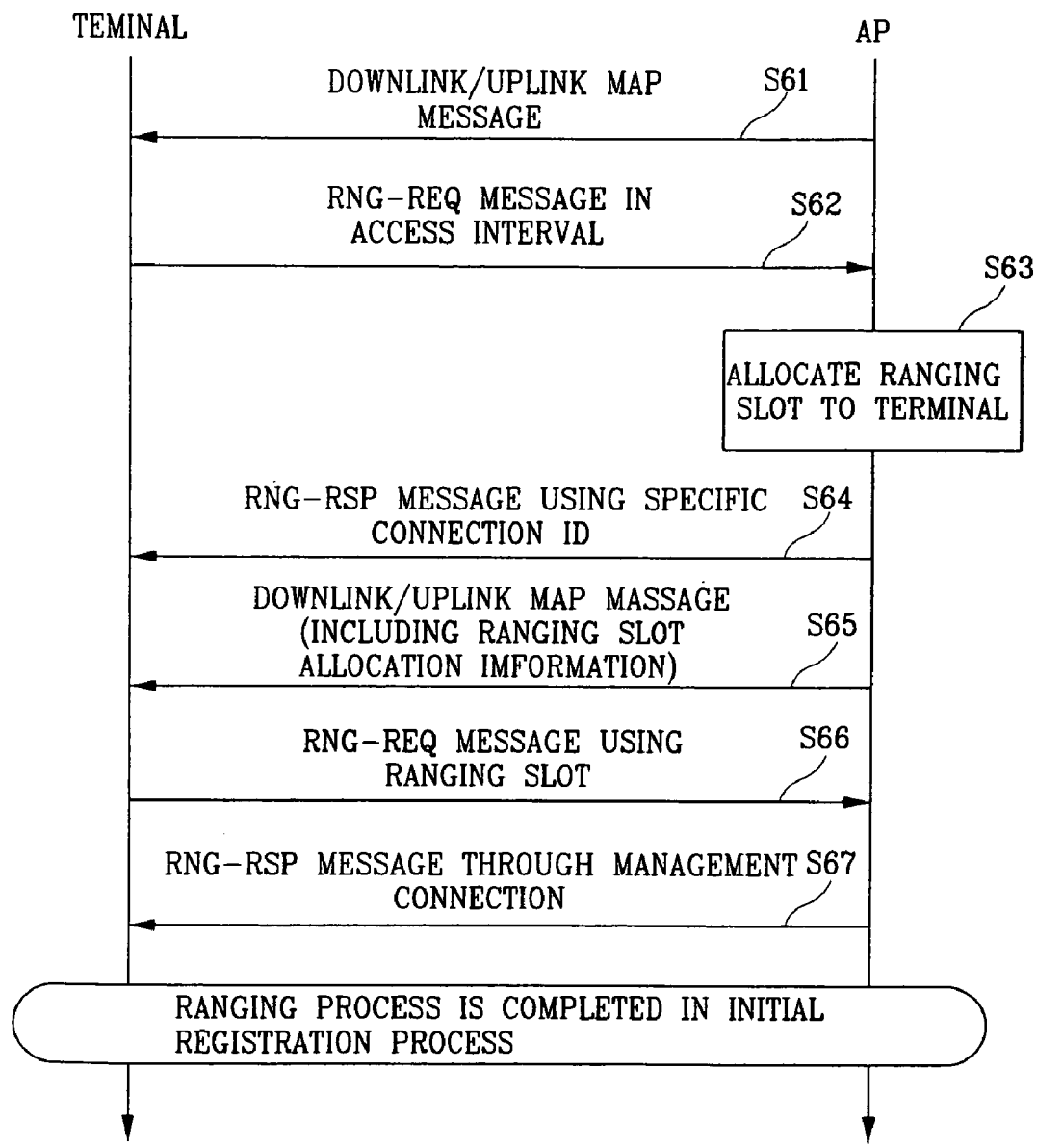
FIG. 16 is a flow chart of an initial ranging process according to an embodiment of the present invention.
Figure 17:
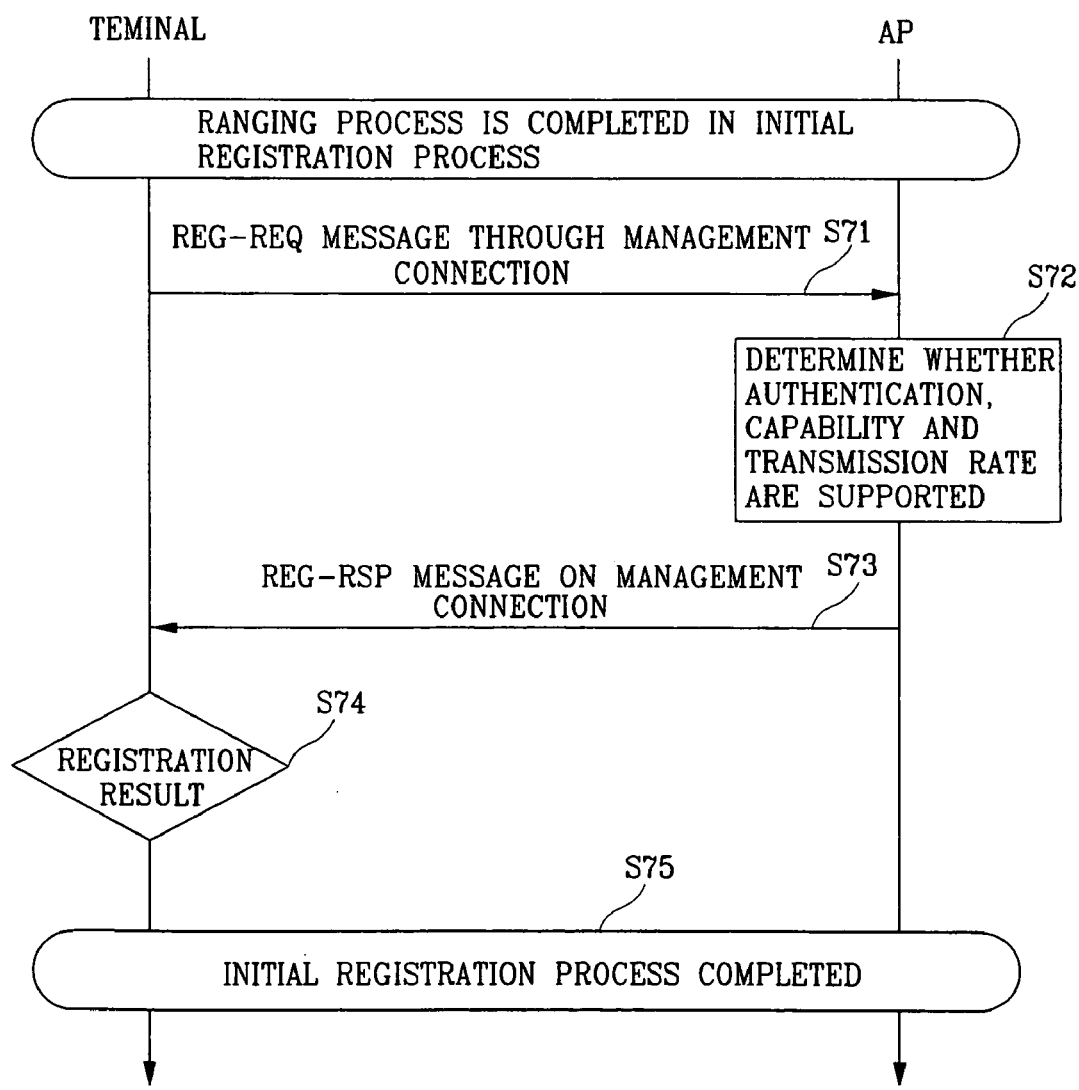
FIG. 17 is a flow chart of a process for the terminals determining permission of registration from an access point according to an embodiment of the present invention.

FIG. 16 is a flow chart of an initial ranging process according to an embodiment of the present invention, and FIG. 17 is a flow chart of a process for the AP 100 determining whether to permit the registration of the terminal 200 according to an embodiment of the present invention.

The initial registration process of the terminal 200 with the AP 100 comprises an initial ranging process of FIG. 16, and a process of the AP 100 determining whether to permit the registration of the terminal 200 as shown in FIG. 17.

The initial ranging process is a process in which the terminal 200 to be connected to the network for the first time communicates information on time synchronization, power level, or frequency offsets with the AP 100 prior to a permission of the AP 100. As illustrated in FIG. 16, the terminal 200 receives a downlink/uplink map message from the AP 100 (in step 61), and sends a ranging request RNG-REQ message at an access interval to the AP 100 (in step 62), to perform first ranging. In this manner, the first ranging is done through a contention using the access interval, and if it is done successfully, the AP 100 allocates a ranging slot to the terminal 200 (in step 63).

Subsequently, the AP 100 sends a ranging response RNG-RSP message to the terminal 200 using a specific connection ID (in step 64), and then a downlink/uplink map message to the terminal 200 (in step 65). The downlink/uplink map message includes allocation information on the ranging slot allocated by the AP 100. Upon receiving the downlink/uplink map message, the terminal 200 sends the ranging request RNG-REQ message to the AP 100 through a ranging slot (in step 66), and receives the ranging response RNG-RSP message from the AP 100 through a management connection (in step 67). In this manner, the second ranging is performed using the ranging slot to complete the initial ranging process.

After the completion of the initial ranging process, as illustrated in FIG. 17, the terminal 200 sends a registration request REG-REQ message to the AP 100 on the management connection (in step 71). The registration request REG-REQ message includes information such as authentication, transmission rate, capability, etc. The AP 100 determines whether or not it can support the information such as authentication, transmission rate, or capability as included in the registration request REG-REQ message (in step 72). Then the AP 100 sends a registration response REG-RSP message on the management connection to inform the terminal 200 of whether to permit the registration (in step 73). If the registration result is confirmed as successful (in step 74), then the initial registration process ends (in step 75).

Next, a description will be given as to a ranging process when the terminal 200 connected to the network requests ranging a second time during data communication with reference to FIG. 18.

Figure 18:
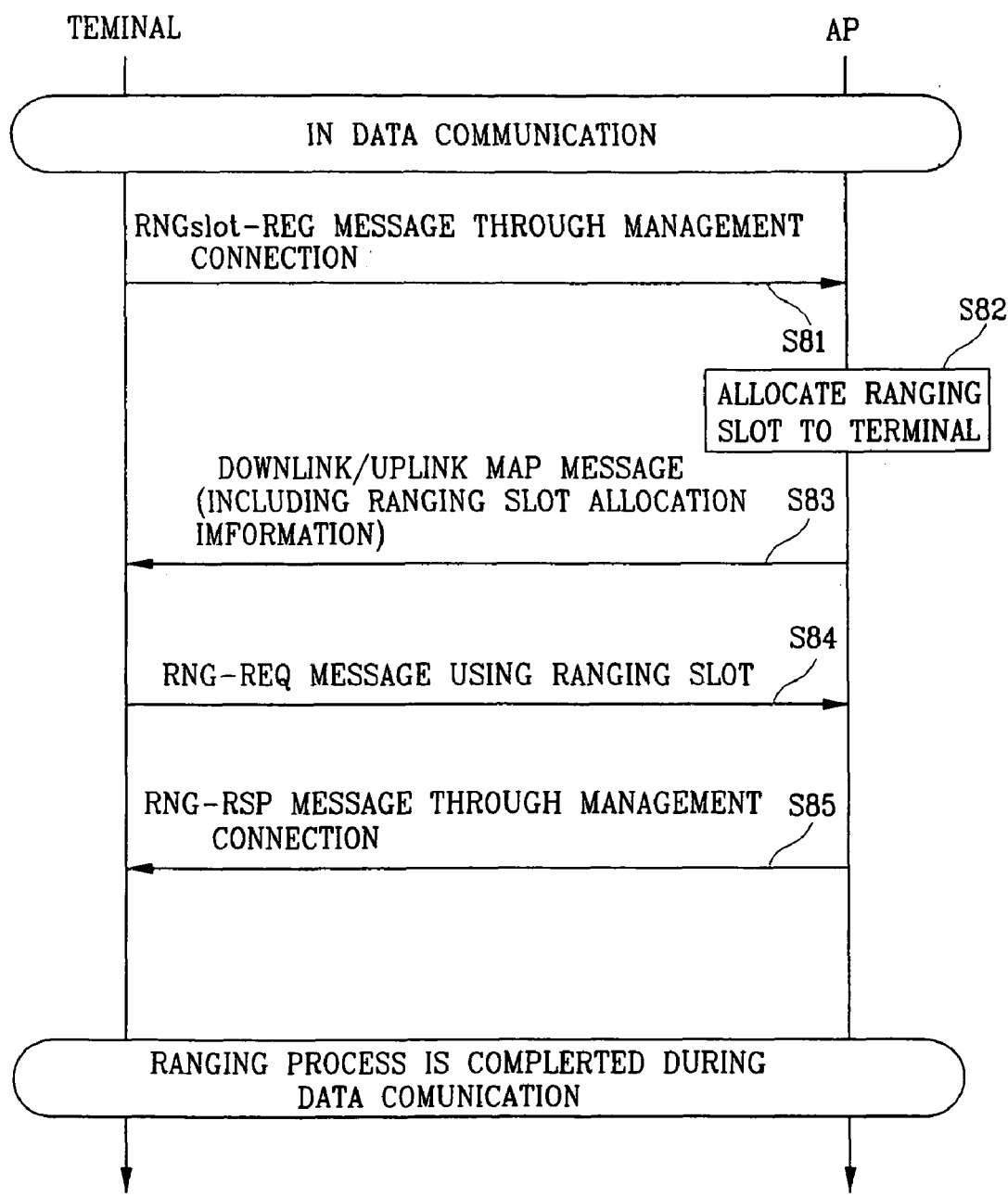
FIG. 18 is a flow chart of a ranging process during data communication according to an embodiment of the present invention.

FIG. 18 shows, in a flow chart form, a ranging process during data communication according to an embodiment of the present invention.

The terminal 200 may decide to perform the ranging process a second time when the packet reception rate is deteriorated for a defined time period due to a change of the channel status. In this case, the terminal 200 sends a ranging slot request (RNGSlot-REQ) message to the AP 100 on the management connection (in step 81), and the AP 100 allocates a ranging slot to the terminal 200 (in step 82). Following the allocation of the ranging slot, the AP 100 sends a downlink/uplink map message including information on the ranging slot allocation status to the terminal 200 (in step 83). The terminal 200 sends a ranging request (RNG-REQ) message to the AP 100 through the ranging slot (in step 84) and receives a ranging response (RNG-RSP) message on the management connection (in step 85), thereby completing the ranging process during data communication.

The above-described MAC frame designing method can be implemented as a program and stored in a recording medium such as CD-ROM, RAM, floppy disk, hard disk, magneto-optical disc, or the like. The MAC frame designing method stored in the recording medium can be executed with a computer.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

The MAC frame structure of the present invention enables efficient provision of a BE service, a real-time VBR service, and a non-real-time VBR service, and maximization of efficiency of time and frequency resources.

What is claimed is:

1. A method of designing a frame which is transferred from a transmitter to a receiver in a wireless communication system having a plurality of sub-carriers, the method comprising:
    assigning, in the transmitter, a connection identification (ID) for identifying a connection between the transmitter and the receiver to the frame, the connection ID being associated with the receiver;
    assigning, in the transmitter, a first information to the frame, the first information being associated with sub-carrier allocation and the connection ID;
    assigning, in the transmitter, a second information to the frame, the second information being associated with a number of allocated information bits per sub-carrier and the connection ID; and
    transmitting, from the transmitter to the receiver, the frame having the connection ID associated with the receiver, the first information, and the second information.

2. The method of claim 1, wherein the number of allocated information bits per sub-carrier is the same for all sub-carriers allocated to the connection ID.

3. The method of claim 1, further comprising allocating the connection ID, the first information and the second information to a downlink map information element included in the frame.

4. The method of claim 3, further comprising allocating the downlink map information element to a downlink map message included in the frame.

5. The method of claim 1, further comprising allocating the connection ID, the first information, and the second information to an uplink map information element included in the frame.

6. The method of claim 5, further comprising allocating the uplink map information element to an uplink map message included in the frame.

7. The method of claim 1, wherein the number of allocated information bits per sub-carrier is not the same for all sub-carriers allocated to the connection ID included in the frame.

8. A non-transitory computer readable medium comprising a computer readable computer program code for executing a method of designing a frame which is transferred from a transmitter to a receiver in a wireless communication system having a plurality of sub-carriers and instructions for causing a computer to implement the method, the method comprising:
    allocating, in the transmitter, a connection ID for identifying a connection between the transmitter and the receiver to the frame, the connection ID being associated with the receiver;
    assigning, in the transmitter, a first information to the frame, the first information being associated with sub-carrier allocation and the connection ID;
    assigning, in the transmitter, a second information to the frame, the second information being associated with a number of allocated information bits per sub-carrier and the connection ID; and transmitting, from the transmitter to the receiver, the frame having the connection ID associated with the receiver, the first information, and the second information.

9. The non-transitory computer readable medium of claim 8, wherein the number of allocated information bits per sub-carrier is the same for all sub-carriers allocated to the connection ID.

10. The non-transitory computer readable medium of claim 8, wherein the method further comprises allocating the connection ID, the first information, and the second information to a downlink map information element included in the frame.

11. The non-transitory computer readable medium of claim 10, wherein the method further comprises allocating the downlink map information element to a downlink map message included in the frame.

12. The non-transitory computer readable medium of claim 8, wherein the method further comprises allocating the connection ID, the first information, and the second information to an uplink map information element included in the frame.

13. The non-transitory computer readable medium of claim 12, wherein the method further comprises allocating the uplink map information element to an uplink map message included in the frame.

14. The non-transitory computer readable medium of claim 8, wherein the number of allocated information bits per sub-carrier is not the same for all sub-carriers allocated to the connection ID.

* * * * *